No. 729,790. Patented June 2, 1903.

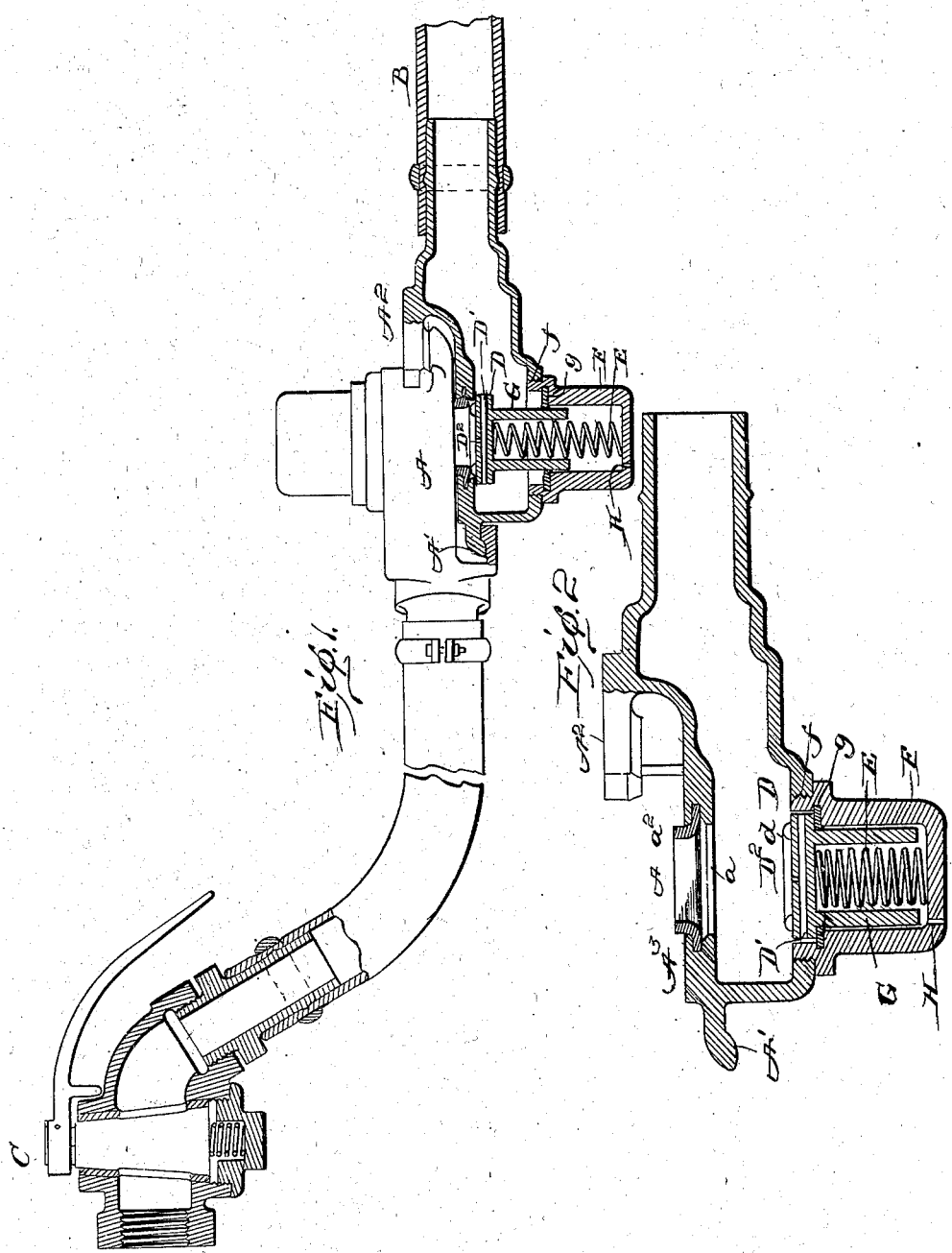

UNITED STATES PATENT OFFICE.

ALBERT OLESON, OF TOLEDO, OHIO.

VALVE-COUPLING FOR AIR-BRAKES OR TRAIN-PIPES.

SPECIFICATION forming part of Letters Patent No. 729,790, dated June 2, 1903.

Application filed February 20, 1902. Serial No. 94,977. (No model.)

*To all whom it may concern:*

Be it known that I, ALBERT OLESON, of Toledo, in the county of Lucas, State of Ohio, have invented certain new and useful Improvements in Valve-Couplings for Air-Brake or Train Pipes; and I hereby declare the following to be a full, clear, and exact description of the same, reference being had to the accompanying drawings, forming a part of this specification, and to the letters of reference marked thereon.

This invention relates to improvements in couplings for connecting the proximate ends of the air-brake or other train pipes in railway-rolling-stock equipment, and more particularly to that type of couplings in which a valve is employed for closing the aperture of the coupling-head, whereby dust, dirt, &c., is excluded, and in case a train should break in two the brakes will be automatically but gradually applied to the rear section, while the application of the brakes on the forward or engine section may still remain under the control of the engineer.

The object of the invention is to provide a valve-coupling in which the valve will be automatic in its action and be controlled in its position by the air-pressure, instead of mechanically, to which ends the invention consists, primarily, in providing a coupling-head having a valve with means whereby said valve will be controlled by the pressure in the train-pipe, and, further, the invention consists in certain novel details of construction and combinations and arrangements of parts, all as will be hereinafter described and pointed out particularly in the appended claims.

Referring to the accompanying drawings, Figure 1 is an elevation of a pair of coupling-heads and the angle-cock connected together with one of said heads in section. Fig. 2 is a detail section of one head with the valve in its opened position, this view being on a somewhat larger scale than Fig. 1.

Like letters of reference in the several figures indicate the same parts.

In the drawings the coupler-heads A are illustrated as being provided with the usual interlocking projections A' and A², whereby the heads on adjacent cars may be connected firmly and yet be capable of separation under heavy strain without injuring the coupling-heads themselves or the pipe connections therewith. These coupling-heads A are mounted on the ends of flexible pipe extensions B, which at their inner ends connect with the train-pipe through angle-cocks C, this equipment being that usually employed in train-pipe construction, and it will be understood may be varied or modified in accordance with any preferred or convenient practice. In each of the coupling-heads there is provided a valve D, adapted to seat outwardly and close the exit-opening $a$ of the coupling-head and preferably provided with an annular projection $d$, adapted to coöperate with the elastic packing or gasket $a^2$, surrounding the exit-opening, this packing, as in the ordinary practice, serving to render the connection between the coupling-heads air-tight in so far as the escape of pressure at the joint is concerned. The valve D is preferably spring-pressed, for which purpose a light spring E is arranged in rear thereof and preferably extending back into a valve and spring-pocket F, which may constitute an integral portion of the coupling-head, but is preferably formed separate therefrom and fitted therein by a screw-threaded connection $f$, as shown. The valve D is further provided with a cylindrical projection G, preferably surrounding the spring E and constituting a piston working into the valve-pocket F, which thus constitutes a cylinder for the piston. The piston is suitably packed by a packing-ring $g$, while an aperture H is provided in the spring-pocket in rear of the valve to permit of the escape and entry of air at atmospheric pressure to and from the outer end of the cylinder. The cylinder, it will thus be seen, is open to atmosphere at one end and to the train-pipe at a point on the inner side of the valve at the other end, and hence if the power of the spring and train-pipe pressure tending to close and hold the valve closed is greater than the train-pipe pressure on the piston tending to open the valve the valve will remain closed, but if the train-pipe pressure on the piston tending to open the valve predominates the valve will open. Augmentation of pressure on the outer side of the valve will cause the pressure tending to open the valve to predominate, and in order that this result may be automatically effected when the cars are coupled together a by-pass or leak for permitting accumulation of pressure in the pipe outside of the valve is provided, as will be presently described. In the preferred construction the area of the valve is greater than the area of the piston, and thus the pressure normally tends to keep the valve closed when once closed, and a spring is preferably employed to inaugurate the closing movement as well as to aid in holding it closed. The by-pass in the preferred construction is formed by a passage D', extending transversely through the face of the valve, and a small central aperture $D^2$, leading from the passage D' out through the face of the valve at the center. With such construction it is obvious that under normal conditions with no pressure in the train-pipe the valve will be seated against its seat $A^3$ around the exit-opening, even though the adjacent coupling-heads are coupled together; but upon the admission of pressure to the train-pipe air will leak through the by-pass $D'$ $D^2$, and when the pressure on both sides of the face of the valve is sufficiently equalized the counter-pressure tending to open the valve by reason of the piston G will overcome the resistance of the spring and force said valve to the position indicated in Fig. 2, where it will be held as long as the train-pipe pressure is maintained, allowing a free passage for the air from the engine back through the whole train.

In practice the angle-cock of the rear car of the train is, as usual, left closed, and when pressure is admitted from the engine such pressure leaks clear back through the train and all of the valves are forced open, as just described. As a consequence the several cars of a train can be coupled up and air turned on from the engine back to the rear car as the cars are added to the train and without setting the brakes or bleeding the train-pipe each time a car is cut in or out, and when the last car is in position the full pressure of air throughout the train will be found to exist and the train is ready to be moved. Again, should a train separate or break in two, the valves at the point of separation close immediately where the coupling-heads are pulled apart, thereby preventing the escape of air except such as shall leak through the by-pass. This leakage is sufficient to apply the brakes slowly on the rear portion of the train; but the pumps on the engine will supply sufficient air to overcome the leakage in the head portion of the train. Thus the latter portion of the train is kept under the control of the engineer, while the brakes are set on the hind portion and danger of accident through the two portions of the train again coming together is greatly lessened. The valves form an efficient guard against the entry of dirt and dust into the train-pipe system, thereby prolonging to a material extent the efficiency and lives of the several delicate valves and brake mechanism, which practice has demonstrated are so liable to become disarranged or stuck at most inopportune times.

Obviously the invention may be applied to coupler-heads of any types or to brake systems of any type without interfering with their work, the brakes can be set under emergency-stops without interference by the valve mechanism, and the valve mechanism, being so simple, is of itself not liable to get out of order or be injured by rough usage, as would be the case were there any of the moving or working parts projecting beyond the coupler-head, as is necessary where valves adapted to be opened mechanically are employed.

Having thus described my invention, what I claim as new, and desire to secure by Letters Patent, is—

1. The combination with train-pipe coupler-heads adapted to be connected together and having registering openings to form a continuous train-pipe between cars, of a valve in each of said coupler-heads movable toward and from the said opening in the head for closing the opening in said head, rearward extensions on said valves forming pistons, by-pass openings for permitting leakage of pressure past both the valves, and cylinders in which the rearward extensions of the valves work, open constantly at the rear ends to atmosphere and at their forward ends to the train-pipe on the inner sides of the valves, whereby accumulation of pressure between the valve-faces by leakage through the by-pass openings, will cause said valves to open for the free passage of train-pipe pressure; substantially as described.

2. The combination with a train-pipe embodying coupler-heads for completing the pipe between cars, of a valve closing toward the pipe-opening to prevent the passage of pressure outward through the coupler-head, said valve having a rearward extension forming a piston, less in area than the area of the valve itself, a cylinder in which said piston works, open to the atmosphere at one end and to the train-pipe pressure at the other and a by-pass for permitting leakage past the valve, whereby the valve is normally held closed by train-pipe pressure, but upon an increase of pressure outside of the valve, it will be opened by train-pipe pressure on the piston; substantially as described.

3. In a train-pipe system for railway-trains, the combination with the train-pipe, coupler-heads coöperating to complete said train-pipe between cars with means whereby said coupler-heads may be connected and disconnected, of a valve for closing the train-pipe to prevent the escape of pressure, a piston connected with the valve, a cylinder in which the piston works open to atmosphere at one end and to the train-pipe on the inner side of the valve-opening, at the other end, whereby train-pipe pressure acts simultaneously in opposite directions on the valve and piston, said parts being so proportioned that with no pressure on the outer side of the valve it will be held closed but upon the accumulation of pressure outside of the valves the power of the piston will predominate and the valve be opened by train-pipe pressure and a by-pass for permitting a leakage of pressure out past the valve; substantially as described.

4. A coupler-head for connecting the train-pipes of adjacent cars in railway equipment, embodying an outwardly-closing valve for closing the exit-aperture of said head, a piston connected with the valve, a cylinder in which the piston works, open to atmosphere at one end and to the train-pipe on the inner side of the valve at the other end, the area of the piston and valve being such that the valve is kept closed when no pressure is on its outer face, but the power of the piston predominates when pressure inside and outside is wholly or partially equalized and a by-pass for permitting a leakage of air past the valve; substantially as described.

5. A coupler-head for connecting the train-pipes of adjacent cars in railway equipment embodying an outwardly-closing valve for closing the exit-aperture of said head, a piston connected with the valve, a cylinder in which the piston works, open to atmosphere at one end and to the train-pipe on the inner side of the valve at the other end, a spring tending to hold the valve closed and the piston at the inner end of the cylinder and a by-pass for permitting a leakage of air past the valve, whereby when pressure on the outer side of the valve is increased the power of the piston will predominate and open the valve; substantially as described.

6. In railway-train equipment, the combination with a train-pipe, cocks for closing said train-pipe and detachable coupler-heads interposed between adjacent cars in said train-pipe, of a valve for closing the exit-aperture of the coupler-head on the forward car, a piston connected with said valve and open continuously to atmospheric pressure in rear of said valve and a by-pass for permitting air to leak past said valve whereby the increase of pressure in the train-pipe of the rear car on the opposite side of the piston will cause said valve to open; substantially as described.

7. In a train-pipe system for transmitting air-pressure, the combination with the train-pipe and detachable means for connecting said pipe between cars, of means for automatically closing said train-pipe to prevent the escape of pressure when the pipe is disconnected between cars, said means embodying a valve held to its seat by train-pipe pressure on one side and opened by train-pipe pressure on the opposite side and a constant leak-opening for permitting the accumulation of pressure on the opening side of the valve when the end of the train-pipe on that side is closed; substantially as described.

8. In a train-pipe system for transmitting air-pressure, the combination with the train-pipe and detachable means for connecting said pipe between cars, of means for automatically closing said train-pipe to prevent the escape of pressure when the pipe is disconnected between cars, said means embodying a valve held to its seat by train-pipe pressure on one side and opened by train-pipe pressure on the opposite side and a constant leak-opening for permitting the accumulation of pressure on the opening side of the valve when the end of the train-pipe on that side is closed, and a spring for inaugurating the closing movement of the valve; substantially as described.

ALBERT OLESON.

Witnesses:
CHARLES E. CARTWRIGHT,
WM. R. HATTERSLEY.